(12) United States Patent
Ibarra et al.

(10) Patent No.: US 9,812,269 B1
(45) Date of Patent: Nov. 7, 2017

(54) ARC FAULT DETECTION IN SOLAR PANEL SYSTEMS

(71) Applicant: Synapse Wireless, Inc., Huntsville, AL (US)

(72) Inventors: Eric Joseph Ibarra, Madison, AL (US); Jeremy Jacob Zoller, New Market, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 361 days.

(21) Appl. No.: 14/643,615

(22) Filed: Mar. 10, 2015

(51) Int. Cl.
    *E04H 9/14* (2006.01)
    *H01H 9/30* (2006.01)
(52) U.S. Cl.
    CPC ..................... *H01H 9/30* (2013.01)
(58) Field of Classification Search
    CPC .. H02H 1/0015; H01H 9/542; H01L 2924/00; H01L 31/02021; E04H 9/14
    USPC .......................................................... 361/2
    See application file for complete search history.

(56) References Cited

U.S. PATENT DOCUMENTS

| | | | | |
|---|---|---|---|---|
| 8,749,934 B2* | 6/2014 | Hackenberg | ........... | H02J 1/10 136/244 |
| 9,148,086 B2* | 9/2015 | Fife | ........... | H02S 40/32 |
| 9,435,845 B2* | 9/2016 | Lang | ........... | H02H 1/0015 |
| 9,559,516 B2* | 1/2017 | Phadke | ........... | H02H 7/1222 |
| 2013/0170084 A1* | 7/2013 | Strobl | ........... | H02H 1/0015 361/79 |
| 2014/0332520 A1* | 11/2014 | Kooijker | ........... | A47J 36/2438 219/439 |
| 2014/0373894 A1* | 12/2014 | Stratakos | ........... | H02S 50/00 136/244 |
| 2015/0077884 A1* | 3/2015 | Behrends | ........... | H02H 1/0015 361/5 |
| 2015/0107646 A1* | 4/2015 | Fife | ........... | H02S 40/32 136/244 |
| 2015/0381111 A1* | 12/2015 | Nicolescu | ........... | H02H 1/0015 361/3 |
| 2016/0156308 A1* | 6/2016 | Alon | ........... | H02S 40/34 136/244 |

* cited by examiner

*Primary Examiner* — Dharti Patel
(74) *Attorney, Agent, or Firm* — Angela Holt

(57) ABSTRACT

A system for detecting arc faults in a solar array generally comprises a plurality of solar panels connected in series, where each solar panel comprises a positive and negative output. A panel monitoring device is connected between the positive and negative output of each solar panel. The panel monitoring device comprises a switching device configurable to disconnect an output from the solar panel. The panel monitoring device comprises logic configured to scan a frequency spectrum of the solar panel and log locations of a plurality of valleys in the spectrum, monitor the plurality of valleys to determine if the plurality of valleys rise above a threshold value, report a fault status when the plurality of valleys rise above the threshold value, and automatically disable the output of the solar panel upon the determination of a fault status.

18 Claims, 13 Drawing Sheets

ARC FAULT DETECTION IN SOLAR PANEL SYSTEMS

BACKGROUND AND SUMMARY

Solar power panels are comprised of panels of solar cells, also known as photovoltaic cells, which convert the sun's energy into electrical power. Like all electrical devices, solar panels are subject to arc faults, discharging of electricity between conductors. Arc faults can trigger electrical fires, damage expensive equipment, and can cause shocks to humans who touch the solar panel hardware. Therefore, detecting arc faults and removing the power source as quickly and efficiently as possible is necessary.

Some common methods to detect arc faults use microcontrollers to sample low-frequency content in photovoltaic strings digitally using analog to digital converters. However, using microcontrollers to directly sample the voltage or current inherently limits the frequency spectrum available for analysis to a region much lower than what would be ideal. Wider bandwidth analysis stands a better chance of more properly determining the true presence of an arc, particularly in the presence of noise from AC inverters. Solar power inverters generate a significant amount of noise when converting the DC output of the solar panels to AC power used by the power grid. The switching power electronics inside the power inverter generate large amounts of noise at the fundamental switching frequency at which it operates and harmonics thereof. The magnitude of this noise can exceed the amplitude of arcs thereby reducing the likelihood of detection in narrow bandwidth and increasing the probability of nuisance trips. Increasing the bandwidth can enable a more robust detection algorithm to be implemented where more data points are available to determine whether or not an arc is present. Arcs produce a specific pink noise spectrum that can be detected more accurately when analyzed over a wide frequency spectrum. While it may be possible to detect the presence of an arc in a narrower bandwidth, those methods will be more susceptible to other noise generating components especially if they are not constant. RF interference and radio communication especially spread spectrum could potentially cover the entire bandwidth of "narrow" band detection circuits. This could lead to nuisance trips or worse yet, failing to detect an arc when in the presence of other noise sources.

Measuring the energy spectral density over groups of frequency bands can be performed as a method to determine if the noise spectrum matches that of an arc event. By understanding the pink noise spectrum characteristic of arc events, a method can be implemented to determine an amplitude threshold that is evaluated as a function of frequency. While a fixed threshold may be acceptable over a narrow bandwidth, utilizing a threshold as a function of frequency allows the detection bandwidth to be usefully extended. If a fixed threshold were employed, there would be no effective method for correctly setting it. If it were configured to operate according to the lower frequency, the noise amplitude at higher frequencies would never cross the detection threshold.

An arc fault detection solution according to the present disclosure is implemented using a true analog solution that takes current measurements at each panel over a large frequency spectrum. The arc fault detection system uses a "high-speed" analog front end made up of low-cost, commercially-available components to mix and convert high-frequency signals down to a point where a relatively low-cost microcontroller can analyze the signals effectively. The method also comprises a software algorithm which is immune to strong spikes, tones, or carrier signals in the frequency spectrum because it implements a "hunting and searching" mode that ignores strong signals and seeks quiet "valleys" in the spectrum to perform a noise floor analysis.

The arc fault detection system uses a panel monitoring device that is installed on solar panels such that it is always inline and available to measure solar panel performance. The panel monitoring device performs continuous and automatic arc fault detection. The panel monitoring device comprises a switching device configurable to disconnect an output from the solar panel upon detection of an arc fault event. Logic resident on the panel monitoring device is configured to scan a frequency spectrum of the solar panel and log locations of a plurality of valleys in the spectrum, monitor the plurality of valleys to determine if the plurality of valleys rises above a threshold value, report a fault status when the plurality of valleys rises above the threshold value, and automatically disable the output of the solar panel upon the determination of a fault status. Because the arc detection device is paired with each panel individually, the device is in the current loop of an arc event in both the parallel and series conditions.

A method of the present disclosure comprises scanning a frequency spectrum of the solar panel and logging locations of a plurality of valleys in the spectrum. The plurality of valleys is monitored to determine if the plurality of valleys rises above a threshold value. If the plurality of valleys rises above the threshold value, an arc fault has occurred, and the output of the solar panel is automatically disabled. This threshold is not limited to a fixed amplitude across frequency, but rather is a threshold defined as a function of frequency.

DESCRIPTION OF THE DRAWINGS

The patent or application file contains at least one drawing executed in color. Copies of this patent or patent application publication with color drawings will be provided by the Office upon request and payment of the necessary fee

DETAILED DESCRIPTION

Figure 1:
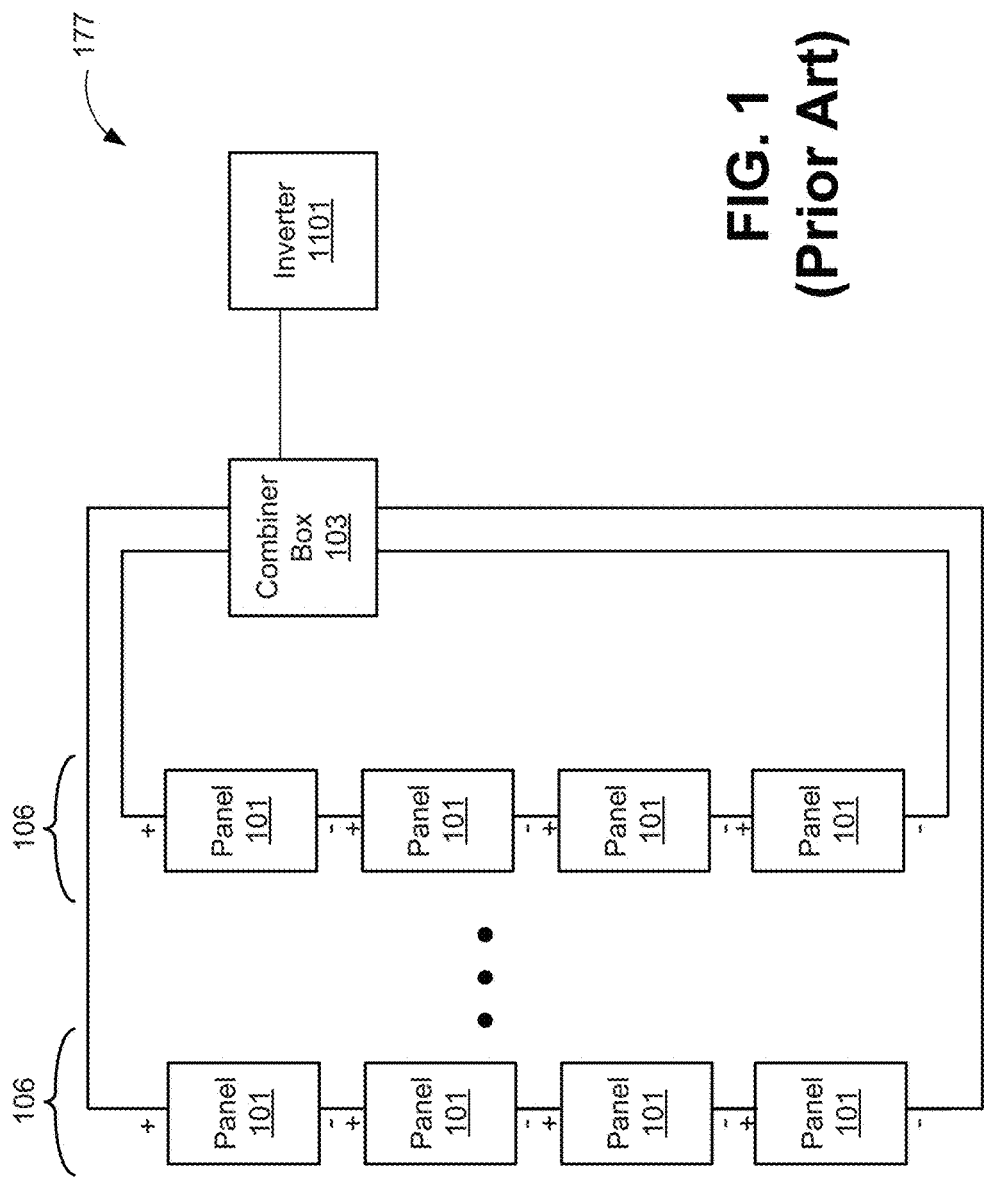
FIG. 1 depicts an exemplary prior art solar array.

FIG. 1 illustrates a prior art solar array 177. The array 177 comprises a plurality of solar panels 101 which generate solar power. In this regard, each solar panel 101 comprises a plurality of solar cells (not shown) that generate current from solar energy. The solar panels 101 are coupled in series to form a string 106. A plurality of strings 106 coupled in parallel form an array 177. A combiner box 103 coupled to the plurality of strings 106 combines the current from the strings 106 into a single combined flow of current that represents a cumulative current from each of the strings of combined panels 101.

The combiner box 103 is coupled to an inverter 1101 that receives the output current, which is DC, and converts the current from DC to alternating current (AC) so that the energy can be applied to a power grid (not shown) for commercial consumption, if desired.

Figure 1A:
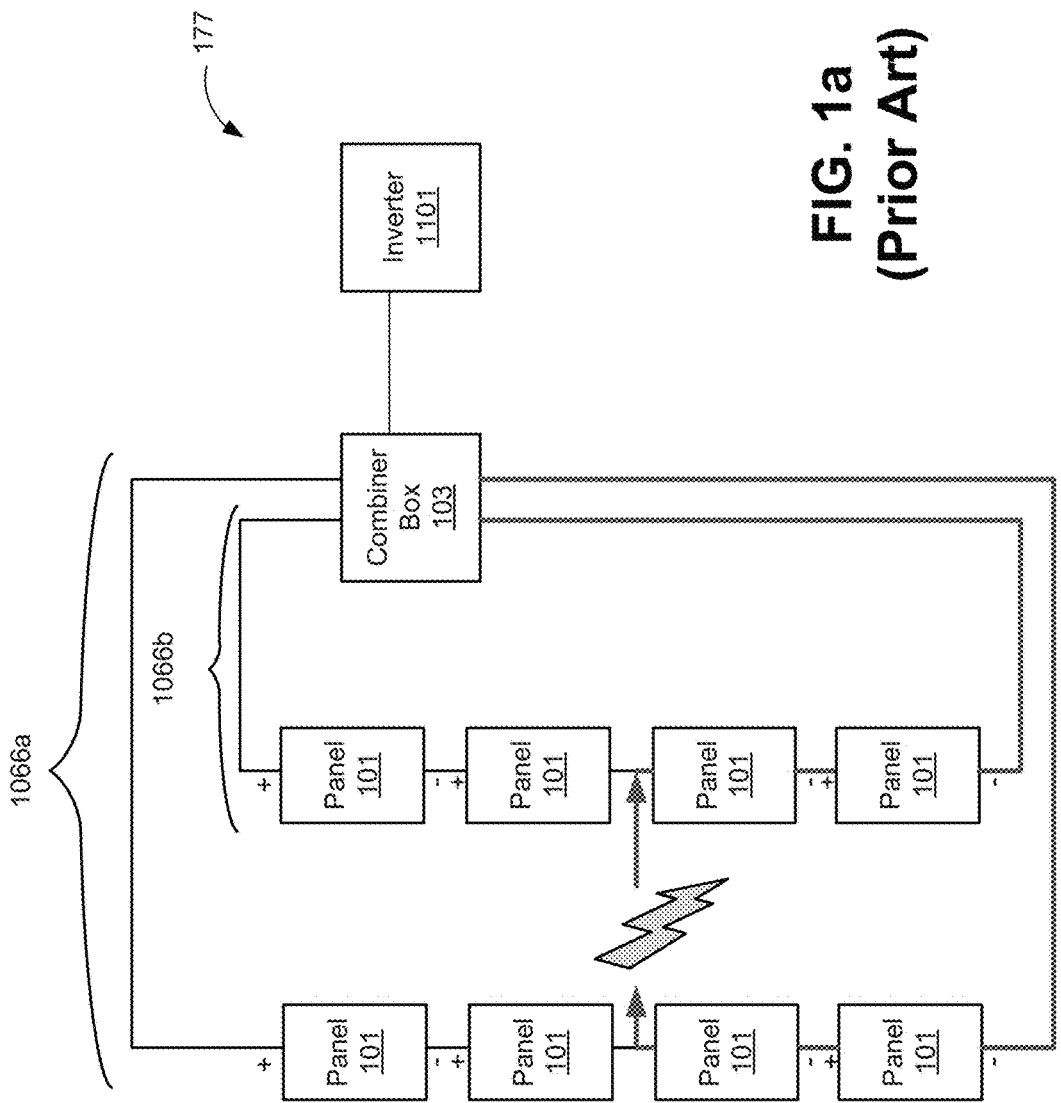
FIG. 1a depicts the prior art solar array of FIG. 1, illustrating a parallel arc fault.

FIG. 1a depicts the prior art solar array 177 of FIG. 1, illustrating a parallel arc fault, i.e., an arc from one string loop 1066a to another string loop 1066b. The red path indicates the current loop with the arc in it. Many traditional protection methods disconnect (i.e., open up) both string loops 1066a and 1066b, which can actually fuel the arc even more.

Figure 1B:
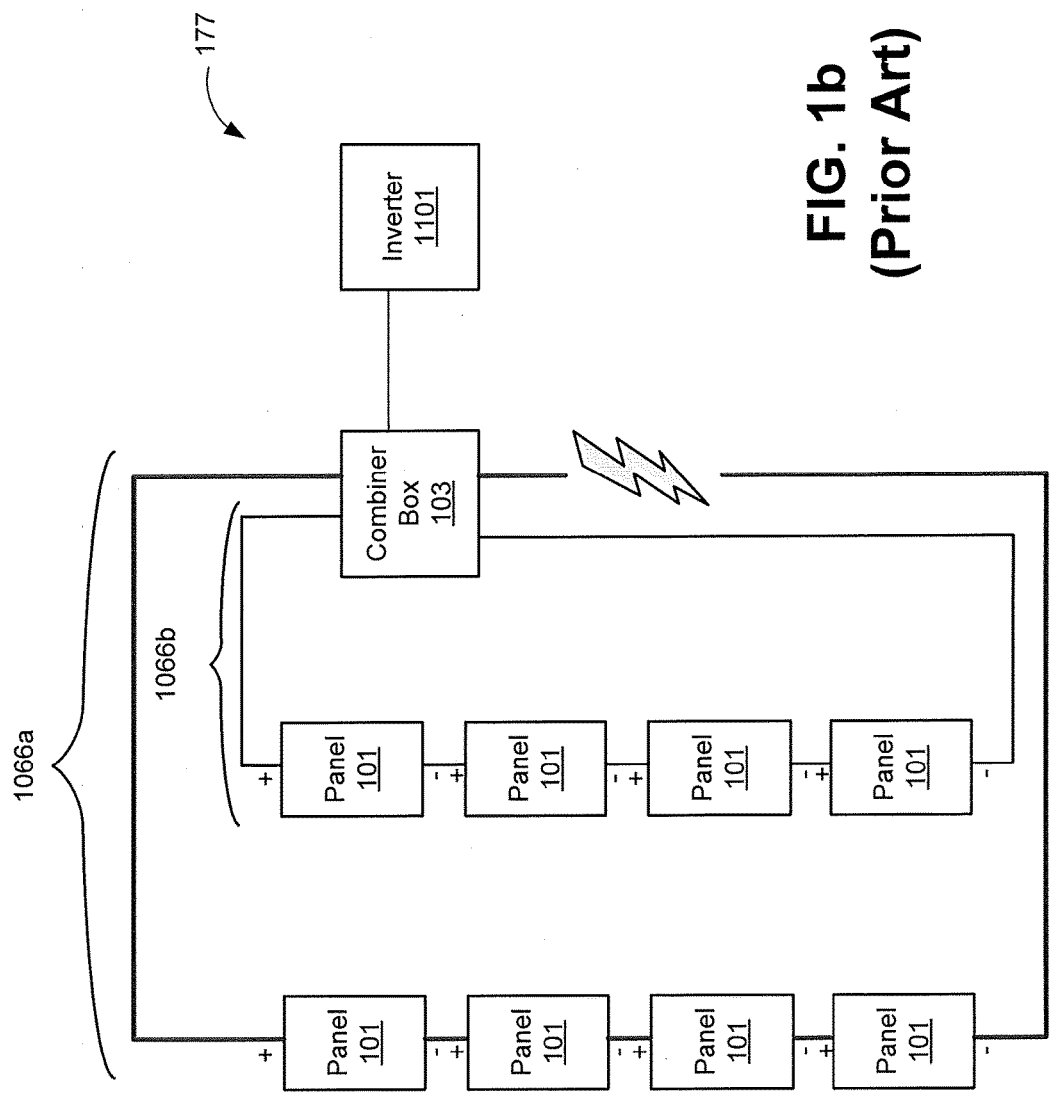
FIG. 1b depicts the prior art solar array of FIG. 1, illustrating a series arc fault.

FIG. 1b depicts the prior art solar array 177 of FIG. 1, illustrating a series arc fault, from break in a line of string loop 1066a, for example. The red path indicates the current loop with the arc in it. Many traditional arc protection methods disconnect this circuit in the combiner box 103.

Figure 2:
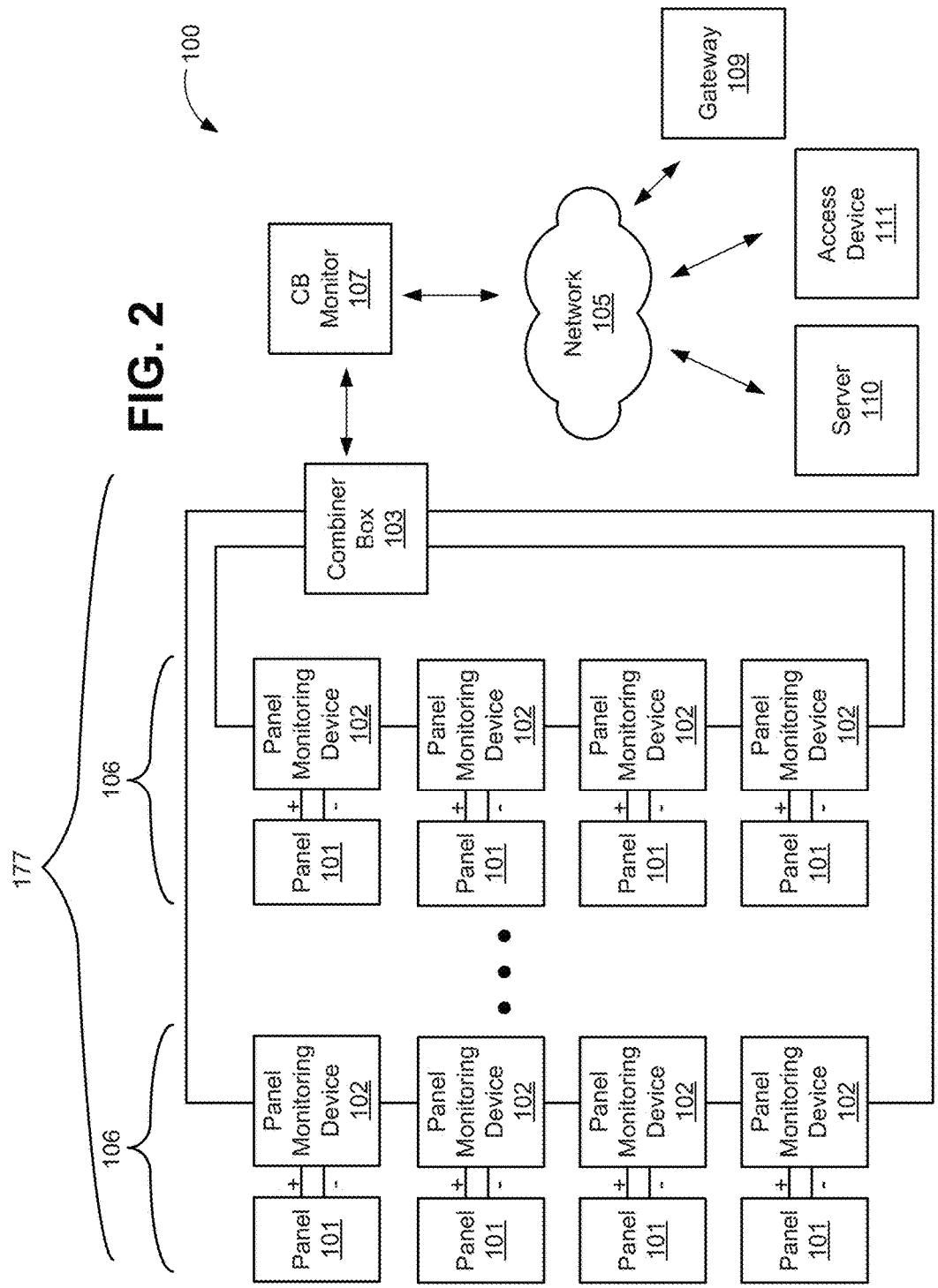
FIG. 2 is a block diagram illustrating a system in accordance with an exemplary embodiment of the present disclosure.

FIG. 2 illustrates a system 100 in accordance with an exemplary embodiment of the present disclosure. The system 100 comprises the solar panels of FIG. 1 formed into strings 106 and an array 177. Although the illustrated embodiment shows four (4) panels 101 in a string 106, and shows two (2) strings 106 in the array 177, the illustration is for explanatory purposes and there may be many more panels 101 in a string 106 and many more strings 106 in an array 177.

In the illustrated embodiment, a panel monitoring device 102 monitors each panel 101. In other embodiments discussed herein, the panel monitoring device 102 may monitor two or more panels 101. In one embodiment, the panel monitoring device 102 is mounted to the back (not shown) of the panel 101. In other embodiments, the panel monitoring device 102 is mounted to the metal racking (not shown) that supports the panels 101 or could be mounted to the panels themselves.

The panel monitoring device 102 is installed between the positive and negative terminals of the panel 101, so that the panel monitoring device can measure the panel's voltage and current (not shown) The panel monitoring device 102 obtains power for its operation from the solar panel 101.

A combiner box (CB) monitor 107 communicates wirelessly with the panel monitoring devices 102. In the illustrated embodiment, the CB monitor 107 couples with and generally resides inside the combiner box 103. In this regard, the CB monitor obtains power for its operation from the combiner box 103.

The CB monitor 107 collects data generally wirelessly from the panel monitoring devices 102. There may be hundreds of panel monitoring devices 102 that are monitored by one CB monitor 107. In some embodiments, the CB monitor also interfaces electrically with each string 106 so that it can collect voltage and current from the strings 106.

A gateway 109 comprises a router or a proxy server (not shown) that routes signals received from the CB monitor 107 to a server 110. In the illustrated embodiment, neither the CB monitor 107 nor the panel monitoring devices 102 communicate directly with the server 110. Rather, the CB monitor 107 collects data from the panel monitoring devices 102 and communicates that data to the gateway 109. In the illustrated embodiment, the server 110 is offsite from the solar array 177. In other embodiments, the server 110 may be combined with the gateway 109 onsite, or may be onsite and may communicate locally with the gateway 109.

The gateway 109 comprises an internet interface and communicates with the server 110 via the internet. In one embodiment, the communication between the gateway 109 and the CB monitor 107 and panel monitoring devices 102 is via a wireless backhaul network (not shown). In other embodiments, the communication may be via a wired network.

Other embodiments may not include the combiner box 107 and in those embodiments, the panel monitoring devices 102 may communicate directly to the gateway 109. In still other embodiments, the panel monitoring devices 102 may operate independently and communicate directly to the server 110.

During operation, the server 110 further communicates with the access device 111. The access device 111 may be a computer located at, for example, a customer's office (not shown). In this regard, the access device is generally not onsite. Upon request from the access device 111 initiated by a user or customer (not shown), the server 110 may transmit data to the access device 111 for display to the user indicative of the performance of solar panels 101 in the customer's solar array 177. The customer may access the server 110 via a web-based cloud account, for example.

The server 110 periodically receives data from the gateway 109 that indicates the performance characteristics of the solar array 177. From the access device 111, the user may also transmit commands to the server 110 for controlling the panel monitoring devices 102. For example, the user may desire to run additional, unscheduled performance testing.

Thus, the access device 111 remotely interfaces with and performs operations related to the system 100. As other examples, the access device 111 may configure hardware, archive historical data, generate alarms and messages, enable system administration, generate reports, or otherwise monitor and/or control the system 100 from a remote location by communication with the server 110 via the network 105. The server 110 then communicates with the panel monitoring devices 103 to perform the identified operations related to the system 100.

The access device 111 may be any suitable computer known in the art or future-developed. In one embodiment, the access device 111 is a "thin client" device which depends primarily on the server 110 for processing activities, and focuses on conveying input and output between the user and the server 110. In one embodiment the access device 111 is a personal computer. In other embodiments, the access device 111 is a personal digital assistant (PDA), cellular or mobile phone, radio system, or the like.

In one embodiment, the server 110 comprises a Web Services application (not shown). The Web Service application provides a plurality of Web application program interfaces (APIs) that allow the data access device 111 to perform operations related to the system 100 through the server 110.

The network 105 may be of any type network or networks known in the art or future-developed, such as the internet backbone, Ethernet, IEEE 802.15, IEEE 802.11, WiMax, broadband over power line, coaxial cable, and the like. The network 105 may be any combination of hardware, software, or both.

Figure 2A:
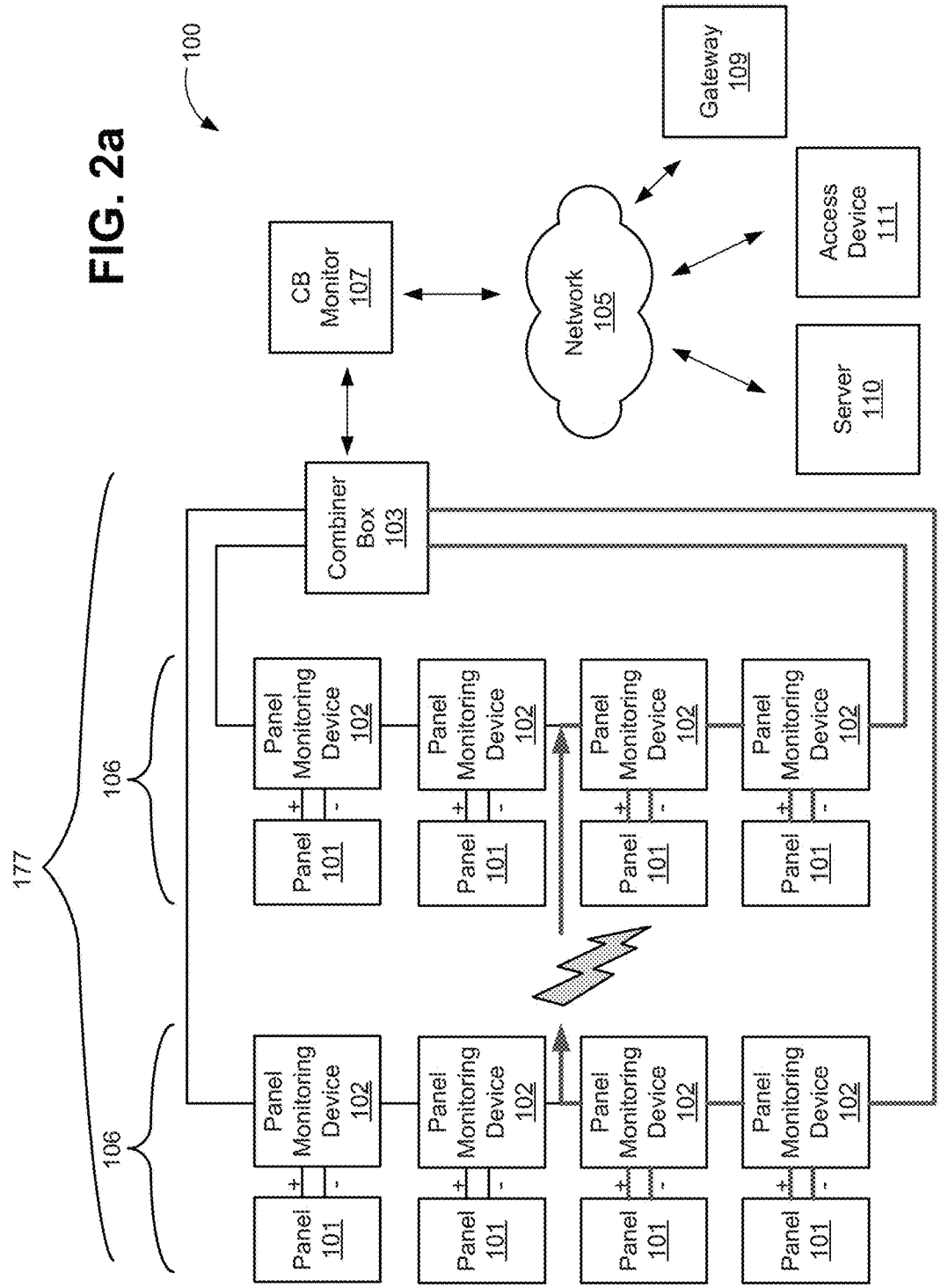
FIG. 2a depicts the system of FIG. 2 with a parallel arc fault.

FIG. 2a illustrates an exemplary parallel arc fault in the system 100 of FIG. 2. The red path indicates a current loop containing the arc. The method disclosed herein enables detection by the panel monitoring devices 102 and immediate disconnection of all sources of current, thereby extinguishing the arc.

Figure 2B:
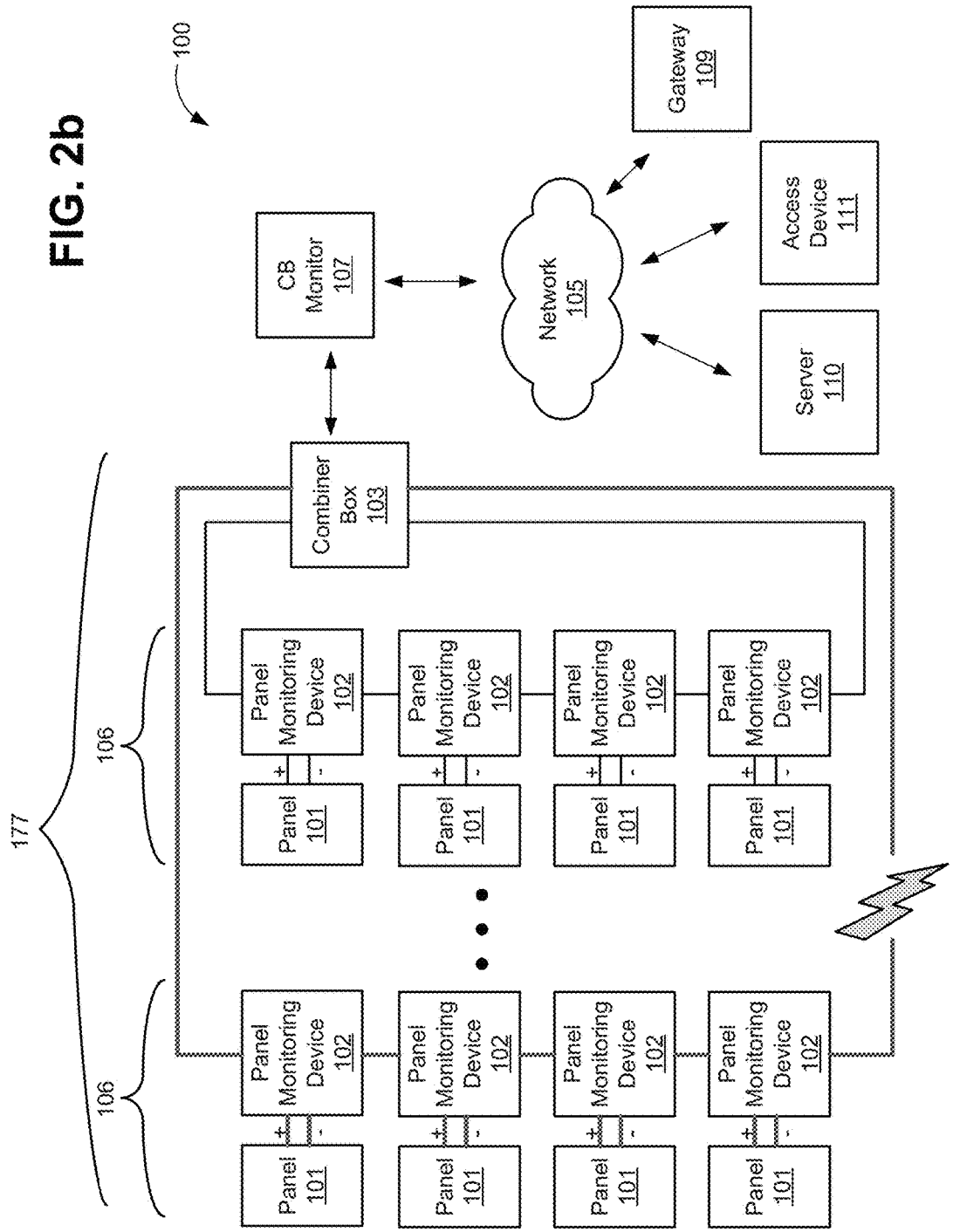
FIG. 2b depicts the system of FIG. 2 with a series arc fault.

FIG. 2b illustrates an exemplary series arc fault in the system 100 of FIG. 2. The red path indicates a current loop containing the arc. The method disclosed herein enables detection of the series arc by the panel monitoring devices 102 and immediately disconnects each panel in the loop to extinguish the arc.

Figure 3:
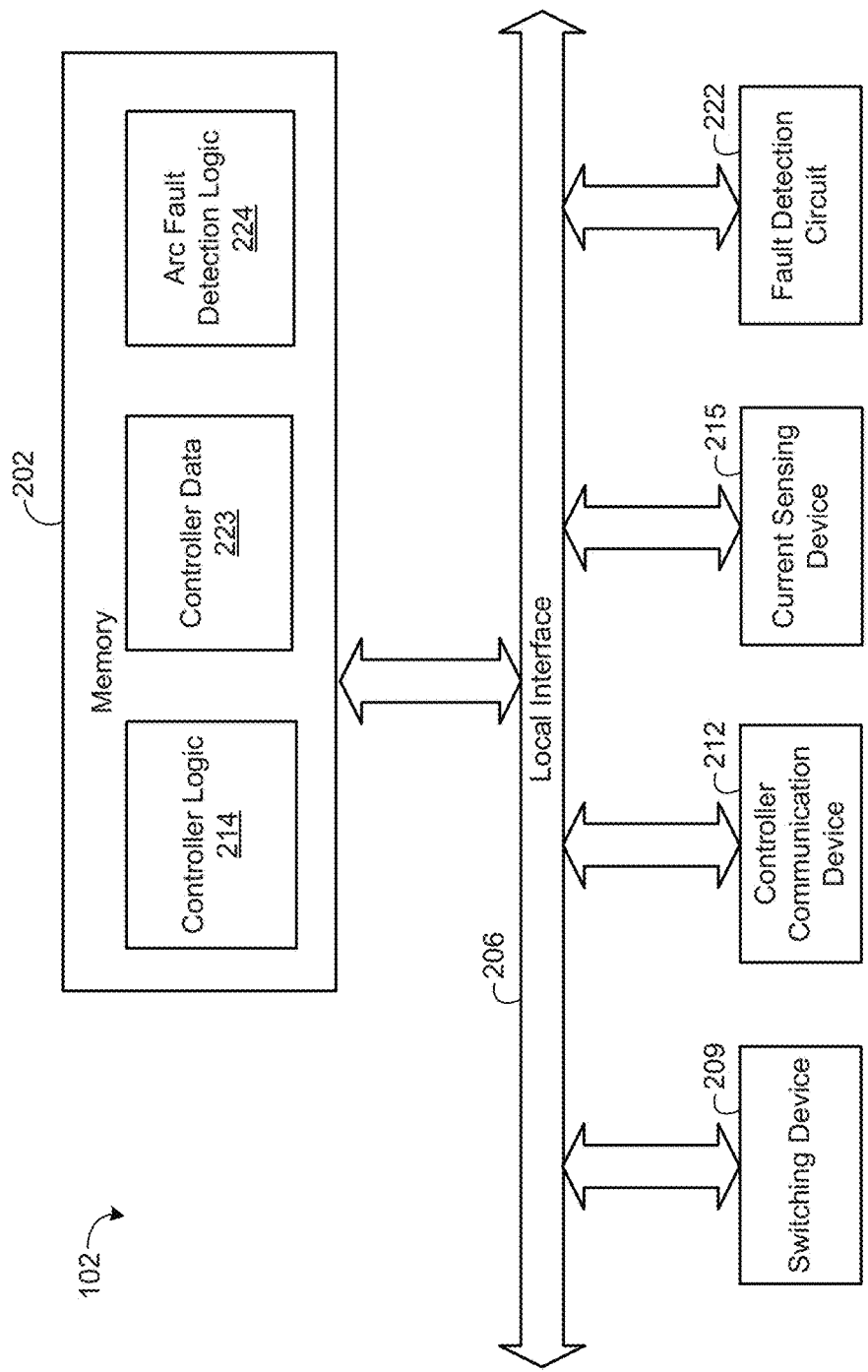
FIG. 3 depicts an exemplary panel monitoring device as depicted in FIG. 1.

FIG. 3 is a functional schematic of an exemplary panel monitoring device 102 according to the present disclosure. The panel monitoring device 102 generally comprises a current sensing device 215, a fault detection circuit 222, a switching device 209, and a controller communication device 212, all communicating over local interface 206.

The panel monitoring device 102 further comprises controller logic 214, controller data 223. The controller logic 214 and controller data 223 can be software, hardware, or a combination thereof. In the exemplary panel monitoring device 102, the controller logic 214 and controller data 223 are shown as software stored in memory 202. The memory 202 may be of any suitable type of computer memory known in the art, such as RAM, ROM, flash-type, and the like. Although shown as a separate block in FIG. 3, the memory 202 is typically resident on the fault detection circuit 222.

As noted herein, the controller logic 214 and the controller data 223 are shown in FIG. 3 as software stored in memory 202. When stored in memory 202, the controller logic 214 and the controller data 223 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

The controller communication device 212 is a device through which the panel monitoring device 102 communicates over the network 105. For example, the communication device 212 may be a Global System for Mobile Communications (GSM) cellular radio port or other type network device, that connects the panel monitoring device 102 with the network 105 for communication with the CB monitor 107 (FIG. 1). The communication device 212 may comprise any number of communications mediums known in the art, for example a wireless solution such as Ethernet, WiMAX, fiber optic, power line carrier (PLC), or the like.

The switching device 209 interfaces with the solar panel 101 (FIG. 1) output (not shown) and controls the solar panel's load during arc fault detection. For example, during operation, the controller logic 214 sends commands to the switching device 209, and in response, the switching device 209 connects and disconnects the solar panel output as needed during arc fault detection, as further discussed herein. The switching device 209 comprises a plurality of electrical relays, transistors, or other switching devices (not shown).

The switching device 209 may be hardware or a combination of hardware and software. The operation of the switching device 209 may be controlled automatically (via controller logic 214) or remotely through commands sent from the server 110 via the gateway 109 to the CB monitor 107 and to the panel monitoring device 102.

The controller logic 214 may also transmit data indicative of events that may need to be addressed immediately, such as the arc fault detection discussed herein. Upon receipt of such data, the server 110 may trigger alarms to third-party communications devices (not shown) including, but not limited, to cell phones, PDAs, computers, pagers, and radios. Alarm events, alarm times, alarm formats, and alarm recipients are some of the parameters configurable by the user (not shown).

The controller logic 214 further communicates with the current sensing device 215. The current sensing device 215 may be hardware, software, firmware, or a combination. The controller logic 214 may also generate status reports and automatically send them (via the CB monitor 107 and gateway 109) to the server 110 on a periodic basis. The server 110 may store the status reports for future retrieval or transmit the status reports to a customer (not shown) using the access device 111. The controller logic 214 is further discussed with respect to FIG. 5 herein.

The controller data 223 may comprise the solar panel 101 location, the current data, the baseline noise level, the valley locations, the threshold level, the fault status, and other such data. 7

Figure 4:
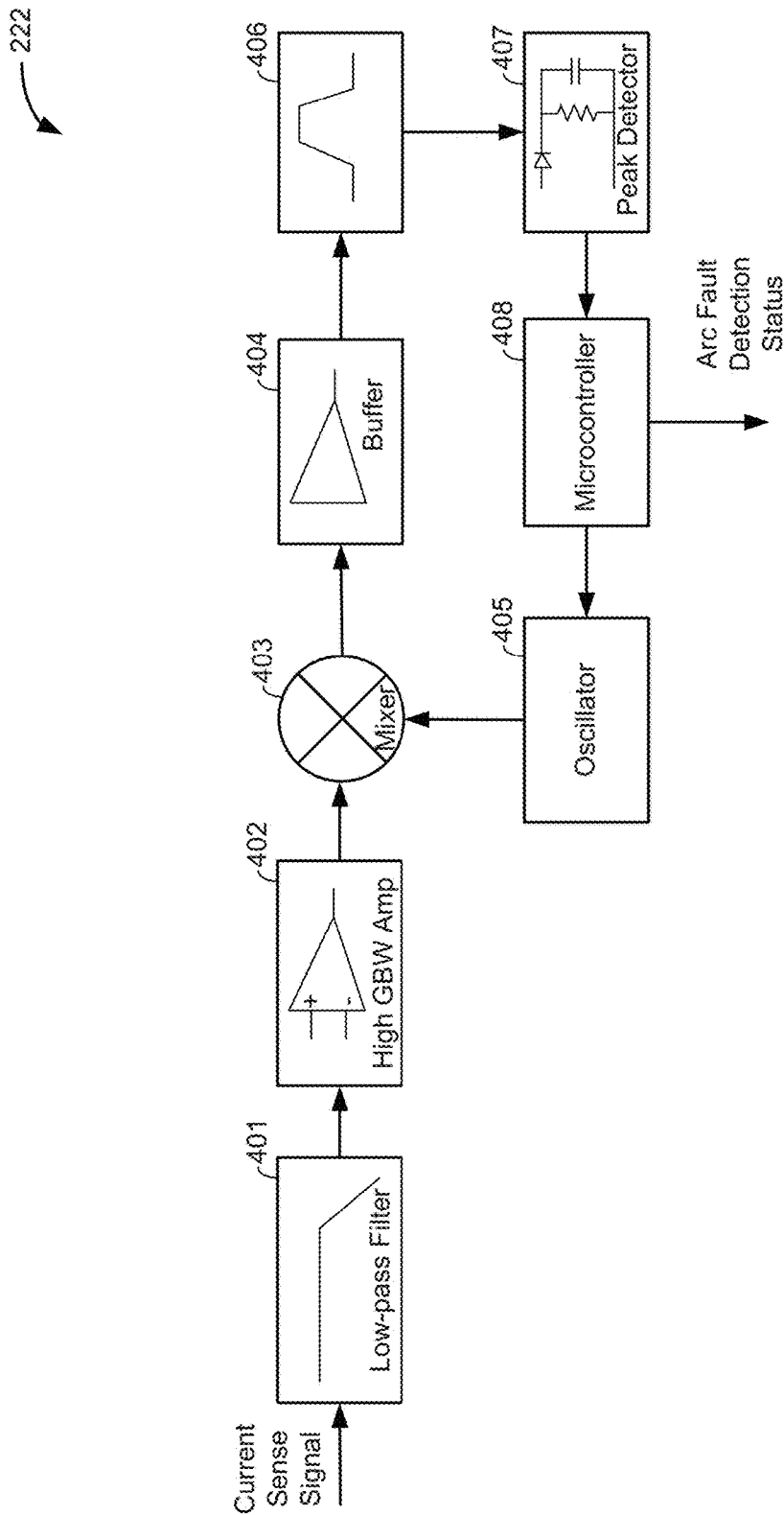
FIG. 4 depicts an exemplary arc fault detection circuit as depicted in FIG. 3.

FIG. 4 depicts an exemplary fault detection circuit 222 according to an embodiment of the present disclosure. In the illustrated embodiment, the fault detection circuit 222 is a wideband AM amplitude detector comprised of generally low cost, off the shelf components. A current sense signal obtained from the current sensing device 205 (FIG. 3) enters a low-pass filter 401. In one embodiment, the low-pass filter is a 5 MHz filter. A high gain bandwidth amplifier 402 amplifies the signal so that the signal is large enough for analysis.

A mixer 403 mixes the amplified current sense signal with a voltage control oscillated signal from an oscillator 405, transforming the current sense signal to sweep the desired frequency spectrum. The resultant signal is routed through a buffer 404 (optional) and a filter 406, which is a 10.7 MHz filter in one embodiment.

A peak detector 407 detects peaks in the signal, as further discussed herein. A microcontroller 408 controls the circuit 222. The microcontroller 222 may be a digital processor or other type of circuitry configured to run the controller logic 214 (FIG. 3) by processing and executing the instructions of the controller logic 214.

Figure 5:
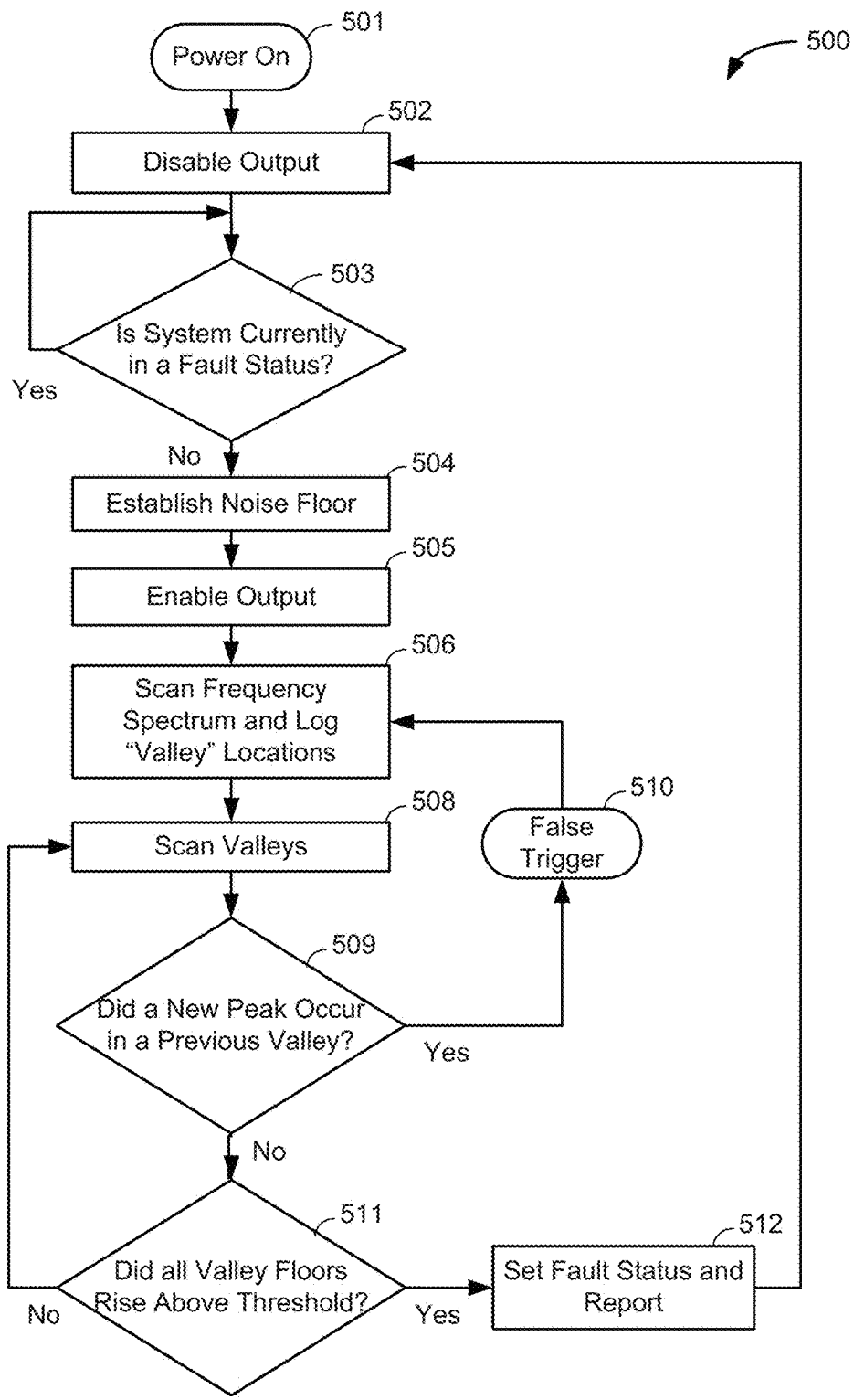
FIG. 5 is a flowchart depicting exemplary architecture and functionality of the logic in accordance with an exemplary embodiment of the disclosure.

FIG. 5 depicts a method 500 utilizing exemplary architecture and functionality of the logic 224 (FIG. 2) in accordance with an exemplary embodiment of the disclosure. In step 501 of the method 500, the solar panel is powered on, either an initial start, a standard daily re-start or a re-start after a fault or other interrupting condition. In step 502 of the method 500, the controller logic 214 causes the switching device 209 to disable the output from the solar panel, i.e., disconnect the solar panel 101 (FIG. 1) from any external load.

In step 502, the controller logic 214 queries to see if the system is currently in a fault status. For example, a previous fault status may have been cleared, and the system reset, such that the system would, therefore, be clear to proceed to normal operation. If the system is currently in a fault status, the controller logic 214 repeats the query on a loop until the system is reset. Note that an arc fault situation requires that the solar panel load be disconnected, and typically a technician must be dispatched to the solar panel field site to fix the fault and manually reset the system.

Figure 6:
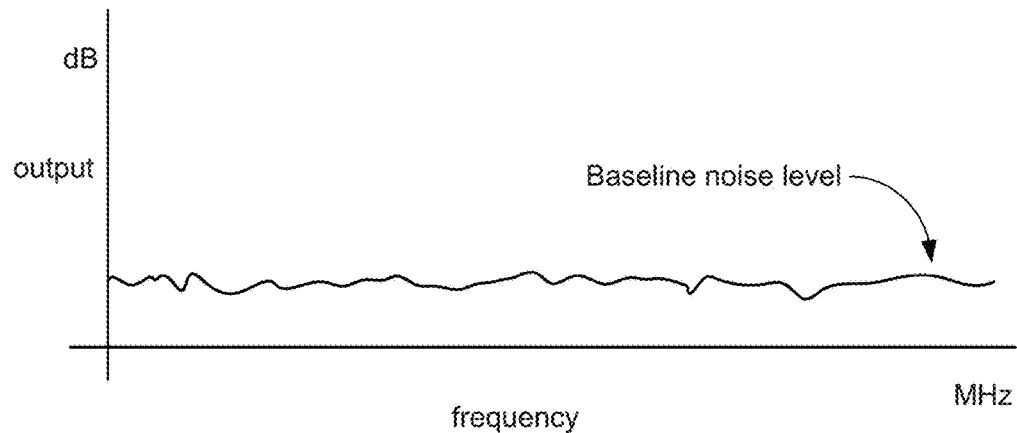
FIG. 6 depicts an exemplary plot of a baseline noise level.

If the system is not currently in a fault status, in step 504 the controller logic 214 establishes a "noise floor." In this regard, the fault detection circuit 222 performs a frequency analysis to measure a floor (or baseline) noise level of the solar panel with the output disconnected, i.e., with no DC load on the solar panel and no neighboring panels connected to the solar panel. FIG. 6 depicts an exemplary baseline noise level of around −100 dB. The controller logic 2014 records the baseline noise level as controller data 223.

In step 505, the controller logic 214 causes the switching device 209 to enable the solar panel's output.

Note than in an alternative embodiment of the method 500, discussed further herein, the noise floor may be established by simply designating a baseline instead of measuring a noise threshold, i.e., without steps 502-505.

Figure 7:
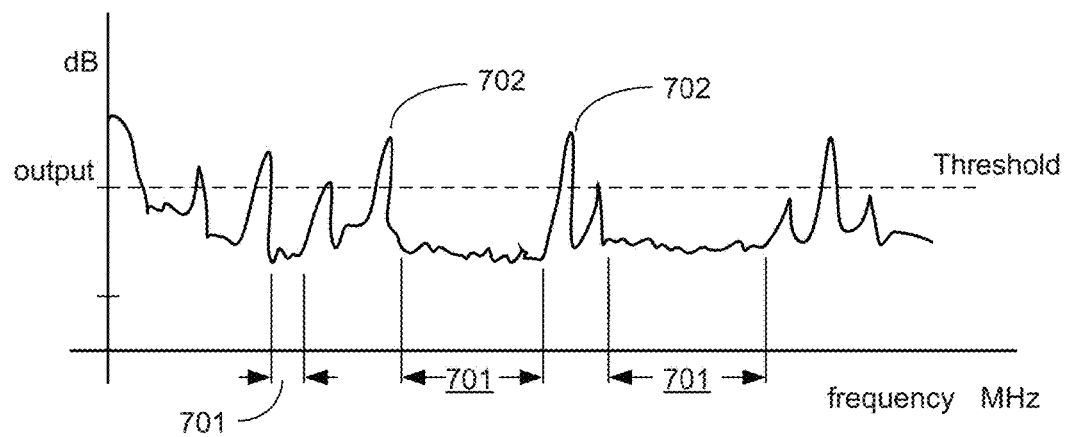
FIG. 7 depicts an exemplary plot of a frequency spectrum sweep.

In step 506, the controller logic 214 sweeps through a large frequency spectrum (from 0 to 5 MHz in the illustrated embodiment) and records the system output over the spectrum. FIG. 7 depicts an exemplary plot of a sweep according to step 506. This step logs the location of "valleys" 701 in the signal across the spectrum. The term "valley," as used herein, refers to "quiet" sections of the spectrum, where the signal does not have significant spikes 702, tones, or carrier signals in the frequency spectrum. Noise and peaks in the spectrum may be due to the AC inverter in the solar field or other noise sources in the area, such as AM transmissions, for example. The valleys 701 are consistent low spots across the spectrum. The controller logic 214 records the spectrum data and valley locations as controller data 223.

In step 508, the valleys 701 identified in step 507 are continually scanned to look for arc faults.

Figure 8:
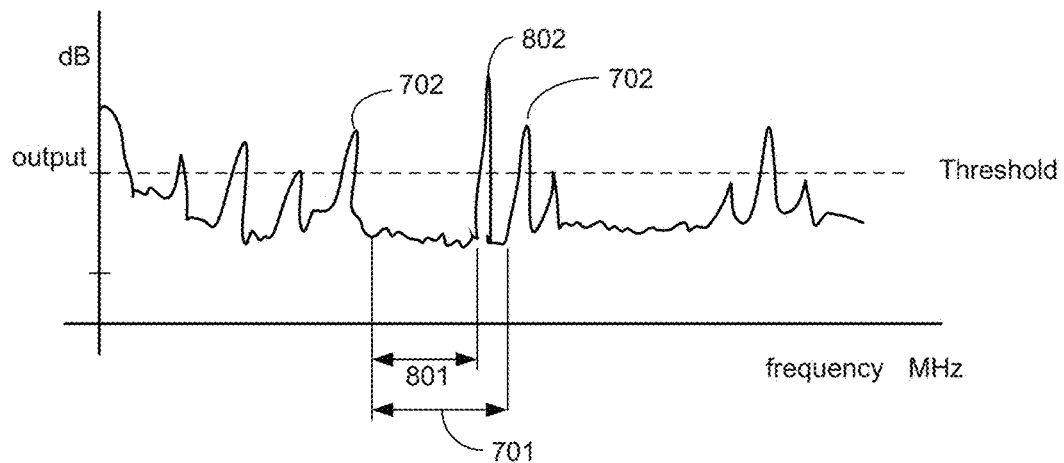
FIG. 8 depicts an exemplary plot of a false trigger event.

In step 509, if the controller logic 214 detects a "new" peak, in a previous valley, the controller logic 214 logs this as a false trigger 510, and repeats step 506 to redefine the valleys. FIG. 8 depicts such a situation, where reference number 802 indicates a new peak in the old valley 701. When step 506 is repeated to redefine the valleys, a new valley 801 will be designated for future scans. The new peak 802 could be caused by a new carrier signal in the area, e.g., someone turning on a random transmitter of some sort that is not a common noise source across the whole spectrum.

In step 511, the controller logic 214 continually monitors the valleys to see if all of the valley floors have risen above the threshold. Such a situation would indicate an arc fault. If the valley floors remain below the threshold, the valley scanning repeats on a loop. If the valley floors all do rise above the threshold, in step 512 the controller logic 214 sets a fault status and reports the fault status, then automatically disables the output, returning to step 502. The output would remain disabled until the fault status is cleared.

In one embodiment, the controller logic 214 also wirelessly reports the arc fault status to other devices (not shown) in the solar panel system, e.g., to other strings in the array or to other components.

Figure 9:
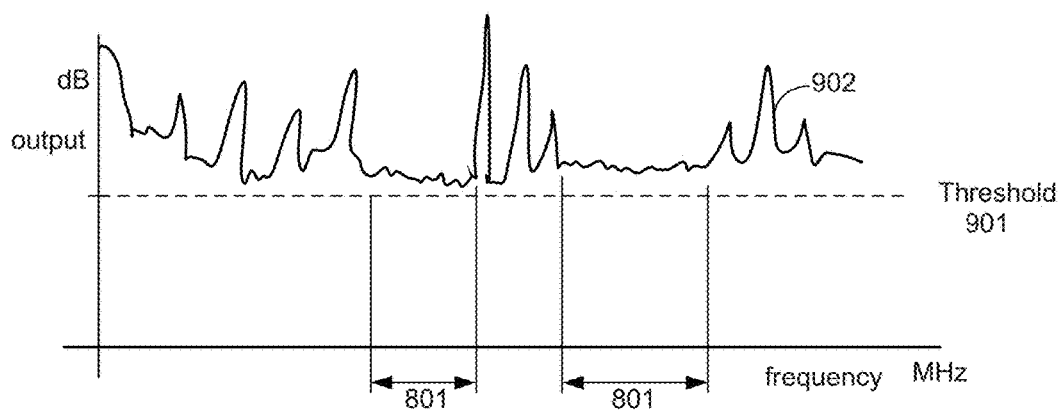
FIG. 9 depicts an exemplary plot of an arc fault detection.

FIG. 9 depicts an exemplary plot of arc fault detection as described above. The output signal 902 has risen above the threshold value 901 for all of the valleys 801. Because the entire noise floor is above the threshold 901, this is certain to be an arc fault situation and not a localized noise source from a radio transmitter.

Figure 10:
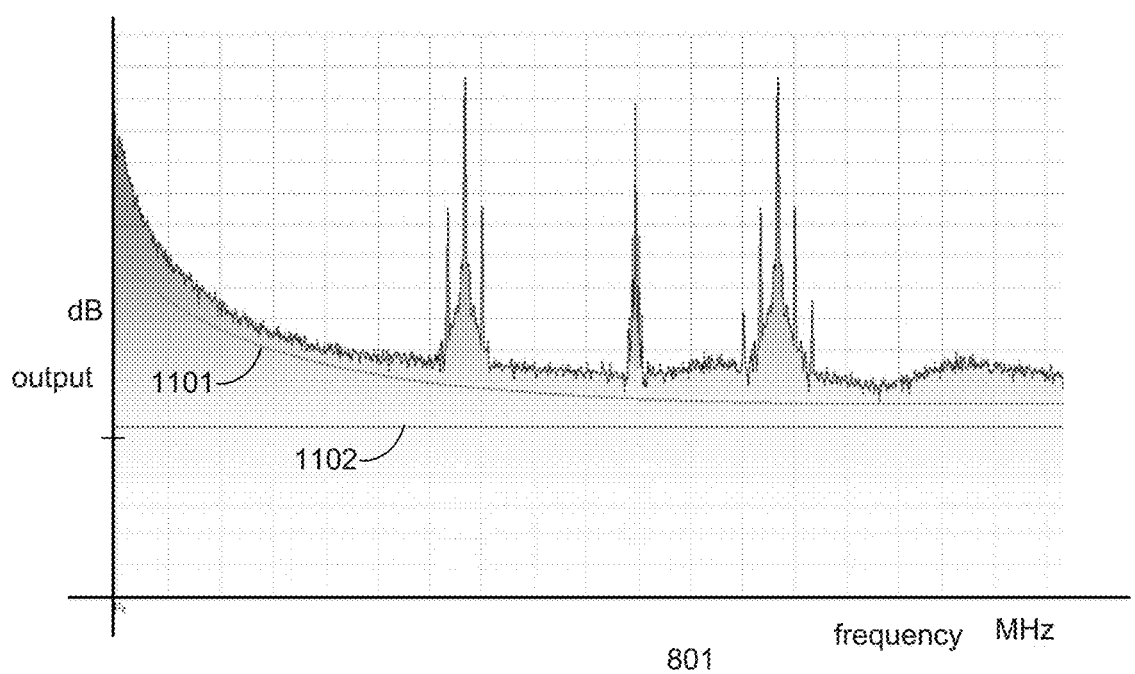
FIG. 10 is an exemplary plot of an arc fault detection using a threshold value that is a function of frequency.

FIG. 10 depicts an exemplary plot of arc fault detection in which a threshold value 1101 is a function of frequency rather than a fixed threshold shown with reference to the discussion above. In this example, the threshold 1101 is an exponentially-decaying function of frequency. For example: the threshold may be represented by the equation: Threshold=$a*e^{(-kf)}+b$, where, where a is a scaling coefficient, e is the mathematical notation for the exponential function, k is the rate of exponential decay, f is the frequency, and b is the offset from zero, or the horizontal asymptote as f approaches infinity.

Figure 11:
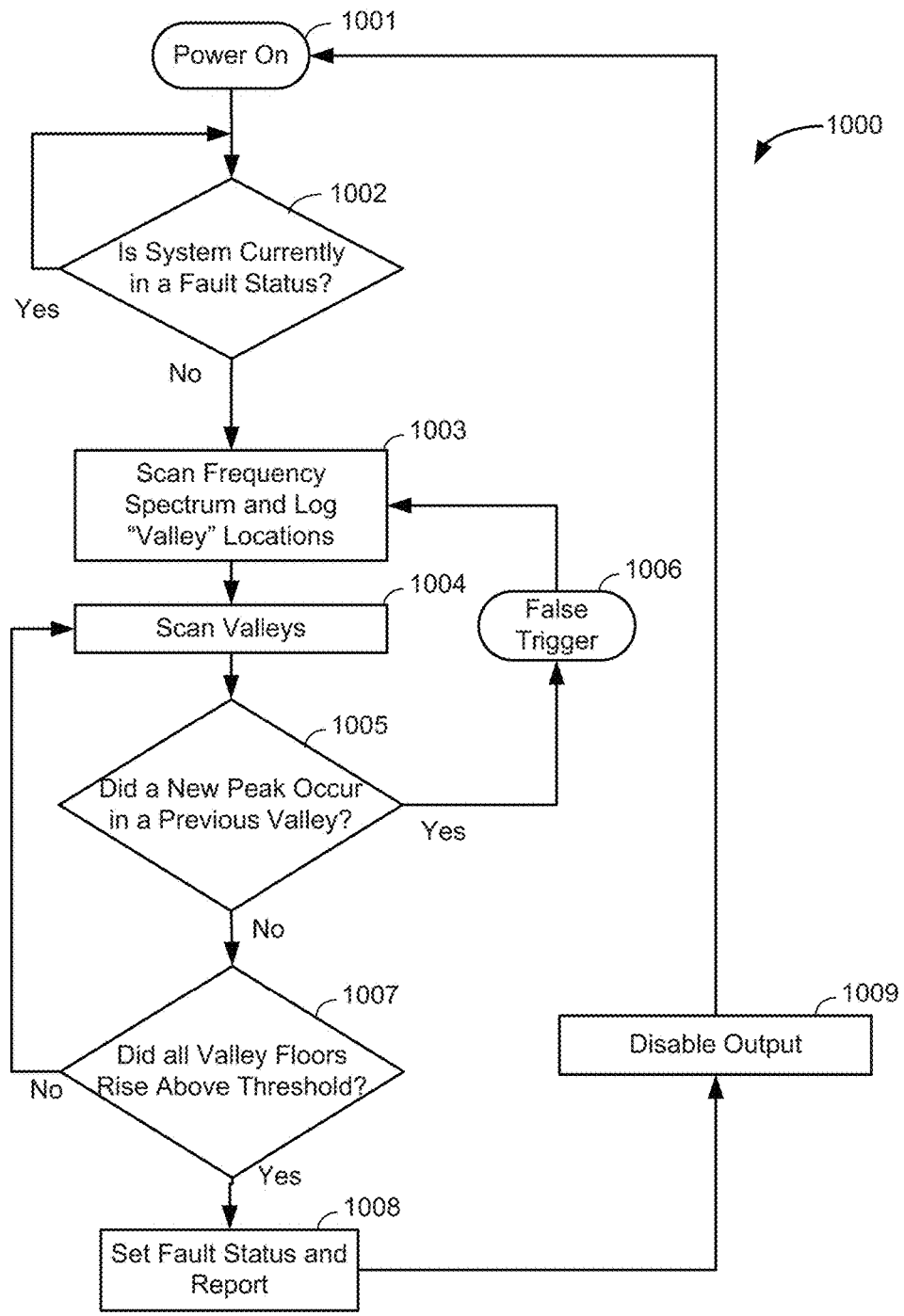
FIG. 11 is a flowchart depicting exemplary architecture and functionality of the logic in accordance with an alternative exemplary embodiment of the disclosure

FIG. 11 depicts an alternative embodiment of a method 1000 for detecting arc faults. In this method 1000, a baseline floor is not determined by measuring background noise as was done in the method 500 of FIG. 5. Rather, a fixed threshold value is set without a measured baseline. In step 1001 of the method 1000, the solar panel system is powered on, either an initial start, a standard daily re-start or a re-start after a fault or other interrupting condition. In step 1002 of the method 500, the controller logic 214 causes the switching device 209 to disable the output from the solar panel, i.e., disconnect the solar panel 101 (FIG. 1) from any external load.

In step 1002, the controller logic 214 queries to see if the system is currently in a fault status. For example, a previous fault status may have been cleared and the system reset. If the system is currently in a fault status, the controller logic 214 repeats the query on a loop until the system is reset.

In step 1002, the controller logic 214 sweeps through a large frequency spectrum (from 0 to 5 MHz in the illustrated embodiment) and records the system output over the spectrum. Step 1002 is the substantially similar to step 506 of FIG. 5.

In step 1004, the valleys 701 identified in step 507 are continually scanned to look for arc faults. Step 1004 is substantially similar to step 508 of FIG. 5.

In step 1005, if the controller logic 214 detects a "new" peak, in a previous valley, the controller logic 214 logs this as a false trigger 1006, and repeats step 1003 to redefine the valleys. Step 1005 is substantially similar to step 509 of FIG. 5.

In step 1007 (which is substantially similar to step 511 in FIG. 5), the controller logic 214 continually monitors the valleys to see if all of the valley floors have risen above the threshold. Such a situation would indicate an arc fault. If the valley floors remain below the threshold, the valley scanning repeats on a loop. If the valley floors all do rise above the threshold, in step 1008 the controller logic 214 sets a fault status and reports the fault status. In step 1009 the controller logic 214 then automatically disables the output. The output would remain disabled until the system is reset, in step 1001.

The embodiments discussed herein primarily analyze frequency content of measured current. Other embodiments employ analysis of frequency content in measured voltage, or analysis of frequency content in both measured voltage and current.

This disclosure may be provided in other specific forms and embodiments without departing from the essential characteristics as described herein. The embodiments described are to be considered in all aspects as illustrative only and not restrictive in any manner.

What is claimed is:

1. A method for automatically detecting arc faults in a solar panel system, the method comprising:

scanning a frequency spectrum of the solar panel and logging locations of a plurality of valleys in the spectrum;

monitoring the plurality of valleys to determine if the plurality of valleys rise above a threshold value;

reporting a fault status when the plurality of valleys rise above the threshold value;

automatically disabling the output of the solar panel upon the determination of a fault status.

2. The method of claim 1 where the step of monitoring the plurality of valleys to determine if the plurality of valleys rises above a threshold valley is performed continuously.

3. The method of claim 1, wherein the arc faults are detected by a panel monitoring device connected to each the solar panel, the panel monitoring device connected between a positive terminal and a negative terminal of the solar panel.

4. The method of claim 3, each panel monitoring device comprising a switching device, the switching device configured to automatically disconnect the output from the solar panel upon the determination of the fault status.

5. The method of claim 1, further comprising logging a false trigger when a peak value occurs in a previous valley location.

6. The method of claim 1, wherein the frequency spectrum is from 0 to 10 megahertz.

7. The method of claim 1, wherein the threshold value is determined by:

automatically disabling the output of the solar panel;

establishing a noise floor by measuring the frequency spectrum with no load on the solar panel;

automatically re-enabling the solar panel output.

8. The method of claim 7, further comprising determining that the solar panel is not currently in a fault status before re-enabling the solar panel output.

9. A panel monitoring device for detecting arc faults in a solar panel system, the device comprising:

circuitry configured to connect between a positive terminal and a negative terminal of the solar panel;

a switching device, the switching device configurable to disconnect an output from the solar panel; and logic configured to scan a frequency spectrum of the solar panel and log locations of a plurality of valleys in the spectrum, monitor the plurality of valleys to determine if the plurality of valleys rise above a threshold value, report a fault status when the plurality of valleys rise above the threshold value, and automatically disable the output of the solar panel upon the determination of a fault status.

10. The panel monitoring device of claim 9, further comprising a fault detection circuit, the fault detection circuit comprising a wideband AM amplitude detector.

11. The panel monitoring device of claim 9, the logic further configured to log a false trigger when a peak value occurs in a previous valley location.

12. The panel monitoring device of claim 9, wherein the frequency spectrum is from 0 to 10 megahertz.

13. The panel monitoring device of claim 9, further comprising logic configured to determine the threshold value by:

automatically disabling the output of the solar panel;

establishing a noise floor by measuring the frequency spectrum with no load on the solar panel;

automatically re-enabling the solar panel output.

14. A system for automatically detecting arc faults in a solar panel system, the system comprising:

a solar panel comprising a positive terminal and a negative terminal;

a panel monitoring device connected between the positive and negative terminal of the solar panel, the panel monitoring device comprising a switching device, the switching device configurable to disconnect an output from the solar panel;

logic configured to scan a frequency spectrum of the solar panel and log locations of a plurality of valleys in the spectrum, monitor the plurality of valleys to determine if the plurality of valleys rise above a threshold value, report a fault status when the plurality of valleys rise above the threshold value, and automatically disable the output of the solar panel upon the determination of a fault status.

15. The system of claim 14, further comprising wirelessly reporting a fault status to other devices in the solar panel system and directing the other devices to disconnect their outputs.

16. The system of claim 14, the logic further configured to log a false trigger when a peak value occurs in a previous valley location.

17. The system of claim 14, wherein the frequency spectrum is from 0 to 10 megahertz.

18. The system of claim 14, further comprising logic configured to determine the threshold value by:

automatically disabling the output of the solar panel;

establishing a noise floor by measuring the frequency spectrum with no load on the solar panel; and automatically re-enabling the solar panel output.

* * * * *